(12) United States Patent
Liao et al.

(10) Patent No.: US 10,774,206 B2
(45) Date of Patent: Sep. 15, 2020

(54) MATTE SYNTHETIC PAPER

(71) Applicant: NAN YA PLASTICS CORPORATION, Taipei (TW)

(72) Inventors: Te-Chao Liao, Taipei (TW); Chun-Lai Chen, Taipei (TW); Wen-Yi Wu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 16/510,429

(22) Filed: Jul. 12, 2019

(65) Prior Publication Data

US 2020/0123363 A1 Apr. 23, 2020

(30) Foreign Application Priority Data

Oct. 19, 2018 (TW) .............................. 107136853 A

(51) Int. Cl.
| | |
|---|---|
| *C08L 23/16* | (2006.01) |
| *C08K 3/22* | (2006.01) |
| *C08K 3/34* | (2006.01) |
| *C08K 3/30* | (2006.01) |
| *C08J 5/18* | (2006.01) |
| *C08J 3/22* | (2006.01) |
| *B32B 27/08* | (2006.01) |
| *B32B 27/32* | (2006.01) |
| *C08F 10/06* | (2006.01) |

(Continued)

(52) U.S. Cl.
CPC .............. *C08L 23/16* (2013.01); *B32B 27/08* (2013.01); *B32B 27/18* (2013.01); *B32B 27/20* (2013.01); *B32B 27/32* (2013.01); *C08F 10/06* (2013.01); *C08J 3/22* (2013.01); *C08J 5/18* (2013.01); *C08K 3/22* (2013.01); *C08K 3/30* (2013.01); *C08K 3/34* (2013.01); *B29C 48/08* (2019.02); *B29C 48/21* (2019.02); *B29K 2023/12* (2013.01); *B29K 2105/0044* (2013.01); *B29K 2509/02* (2013.01); *B29K 2995/0053* (2013.01); *B32B 2250/05* (2013.01); *B32B 2307/518* (2013.01); *C08J 2323/10* (2013.01); *C08J 2323/16* (2013.01); *C08J 2423/10* (2013.01); *C08K 2003/2213* (2013.01); *C08K 2003/2241* (2013.01); *C08K 2003/3045* (2013.01); *C08K 2003/343* (2013.01); *C08K 2201/014* (2013.01); *C08L 2203/16* (2013.01); *C08L 2310/00* (2013.01); *Y10T 428/2848* (2015.01)

(58) Field of Classification Search
CPC .... B32B 27/20; B32B 27/18; Y10T 428/2848
USPC ...................................... 428/32.33
See application file for complete search history.

(56) References Cited

U.S. PATENT DOCUMENTS

| | | | |
|---|---|---|---|
| 2003/0035944 A1* | 2/2003 | Blackwell ................ | B32B 7/02 428/328 |
| 2008/0206505 A1* | 8/2008 | Blackwell ................ | B32B 7/12 428/41.8 |

FOREIGN PATENT DOCUMENTS

CN 1325547 C 7/2007

* cited by examiner

*Primary Examiner* — Betelhem Shewareged
(74) *Attorney, Agent, or Firm* — Li & Cai Intellectual Property (USA) Office

(57) ABSTRACT

A matte synthetic paper is a biaxially oriented polypropylene synthetic paper having a thickness of 25 to 300 μm, and includes a printing surface layer as an outermost paper layer. Moreover, by adding a mist flour or a thermoplastic elastomer, the haze and gloss of the printing surface layer can be (Continued)

improved. According to Tappi T480, the printing surface layer having gloss of 15 to 50% is suitable to be printing paper.

9 Claims, 2 Drawing Sheets

(51) Int. Cl.
    *B32B 27/20*     (2006.01)
    *B32B 27/18*     (2006.01)
    *B29C 48/08*     (2019.01)
    *B29C 48/21*     (2019.01)
    *B29K 23/00*     (2006.01)
    *B29K 105/00*     (2006.01)
    *B29K 509/02*     (2006.01)

MATTE SYNTHETIC PAPER

CROSS-REFERENCE TO RELATED PATENT APPLICATION

This application claims the benefit of priority to Taiwan Patent Application No. 107136853, filed on Oct. 19, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a matte synthetic paper, and more particularly to a biaxially oriented polypropylene (BOPP) synthetic paper having high haze and low gloss characteristics on a printing surface and being suitable to be a printing paper.

BACKGROUND OF THE DISCLOSURE

A conventional biaxially oriented polypropylene synthetic paper (hereinafter referred to as synthetic paper) is a synthetic paper of a multi-layer laminated structure. The synthetic paper 10 with a three-layer structure, as shown in FIG. 1, is composed of an outermost paper layer (A1), a foamed middle layer (C1), and an innermost paper layer (E1) that are sequentially stacked. A manufacturing process thereof, as shown in FIG. 2, is to use three extruders (a1, c1, and e1) to form a three-layer laminated product of hot-melt state by squeezing the composition of each layer into a homo-T-die.

A synthetic paper 15 with a five-layer structure, as shown in FIG. 3, is composed of an outermost paper layer (A2), an upper resin layer (B2), a foamed middle layer (C2), a lower resin layer (D2), and an innermost paper layer (E2) that are sequentially stacked. The manufacturing process thereof, as shown in FIG. 4, is to use five extruders (a1, b1, c1, d1, and e1) to form a five-layer laminated product of hot-melt state by squeezing the composition of each layer into the homo-T-die.

The prepared hot-melt three-layer or five-layer laminated product is rapidly cooled by a cooling molding device 20, longitudinally extended 2.5 to 8 times by a longitudinal extension device 30, and transversely extended 2.5 to 8 times by a transverse extension device 40. After a high-frequency treatment of a corona treatment device 50, the surface tension is raised, and then a synthetic paper 10 with the three-layer structure or the synthetic paper 15 with the five-layer structure is collected with a coiler 60.

However, after nearly 20 years of development, the quality of the biaxially oriented polypropylene synthetic paper still has the disadvantage of uneven printing haze, so that it has not reached the goal of replacing natural paper products.

SUMMARY OF THE DISCLOSURE

In response to the above-referenced technical inadequacies, the present disclosure provides a matte synthetic paper. Mist flour or both mist flour and thermoplastic elastomer are added to a formulation composition of an outermost paper layer (hereinafter referred to as a printing surface layer of a synthetic paper) of a conventional synthetic paper having a three-layer or five-layer or multi-layer laminated structure, so that the printing surface layer of the synthetic paper is formed into a slightly rough surface. When incident light reaches a slightly rough surface, a direction of light reflection changes, so that the synthetic paper has a printing surface with high haze and low gloss characteristics, which is suitable for printing and may even replace natural paper products.

The matte synthetic paper of the present disclosure has a printing surface layer (or an outermost paper layer thereof) including the following components based on the total weight of the outer surface layer (or outermost paper layer), and the total composition of each component is 100% by weight:

(1) 0 to 66 wt % of polypropylene;
(2) 0 to 30 wt % of polyethylene;
(3) 10 to 15 wt % of titanium dioxide M.B which contains 30 to 60 wt % of titanium dioxide;
(4) 10 to 15 wt % of calcium carbonate M.B which contains 40 to 70 wt % of calcium carbonate;
(5) 1 to 5 wt % of antioxidant M.B; preferably 1 to 2 wt %;
(6) 4 to 75 wt % of mist flour M.B which contains 10 to 70 wt % of mist flour; preferably 8 to 55 wt %; and
(7) 0 to 25 wt % of thermoplastic elastomer preferably 5 to 20 wt %;

The beneficial effect of the matte synthetic paper of the present disclosure is that the printing surface layer has high haze, low gloss, and no pit defects, so as to provide excellent printability. Therefore, the matte synthetic paper is suitable for printing, and can improve the acceptance and usage rate of synthetic paper.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
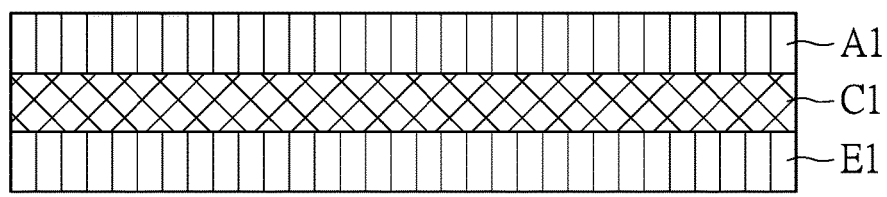
FIG. 1 is a schematic view of a synthetic paper with a three-layer structure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 3:
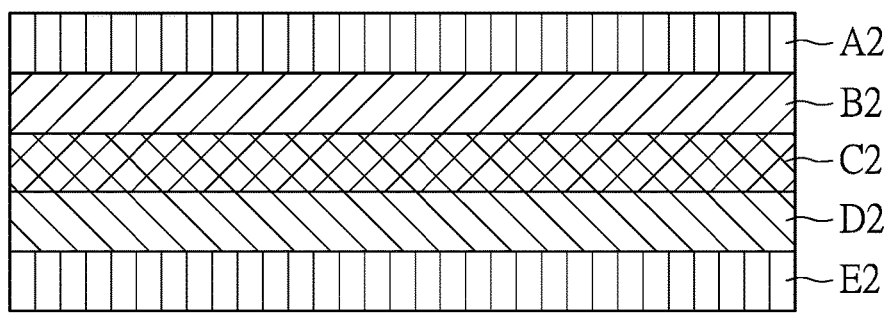
FIG. 3 is a schematic view of a synthetic paper with a five-layer structure.
Figure 4:
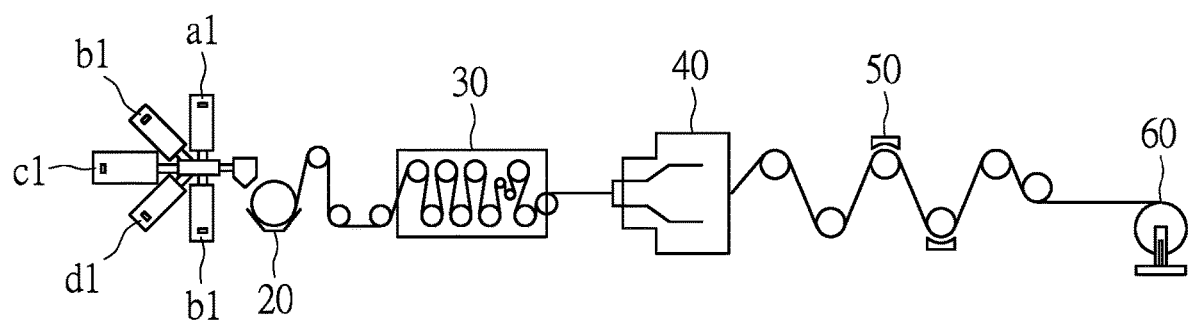
FIG. 4 is a manufacturing flow chart of the synthetic paper with the five-layer structure.

A matte synthetic paper of the present disclosure is a synthetic paper of a multilayer laminated structure having a thickness of 25 to 300 μm, and can be formed into a laminated structure having three or more layers. The matte synthetic paper of the present disclosure is exemplified by a matte synthetic paper having a three-layer or five-layer laminated structure, and the laminated structure thereof is the same as a laminated structure of the three-layer or five-layer synthetic paper 10 or 15 shown in FIG. 1 and FIG. 3. A manufacturing process and the production process are also the same, and an outermost paper layer of the synthetic paper is used as a printing surface layer.

The matte synthetic paper of the present disclosure, in a formulation of the printing surface layer (or the outermost paper layer thereof), has an addition of mist flour or both mist flour and thermoplastic elastomer, and a gloss of the printing surface layer (or the outermost paper layer thereof) is 15 to 50%, preferably 18 to 46%, based on Tappi T480.

A slightly rough surface can be formed on the printing surface layer of the matte synthetic paper of the present disclosure by the formulation, so that the printing surface layer has high haze, low gloss, and the surface of the printing surface layer has no pit defects, so that printability is excellent. Therefore, the matte synthetic paper is not only suitable for printing, but also suitable to be a coating material for a coated product.

The matte synthetic paper of the present disclosure has a printing surface layer (or an outermost paper layer thereof) including the following components based on the total weight of the outer surface layer (or outermost paper layer), and the total composition of each component is 100% by weight:

(1) 0 to 66 wt % of polypropylene; preferably 2 to 65 wt %;
(2) 0 to 30 wt % of polyethylene; preferably 1 to 15 wt %;
(3) 10 to 15 wt % of titanium dioxide M.B which contains 30 to 60 wt % of titanium dioxide;
(4) 10 to 15 wt % of calcium carbonate M.B which contains 40 to 70 wt % of calcium carbonate;
(5) 1 to 5 wt % of antioxidant M.B; preferably 1 to 2 wt %; which is a commonly used antioxidant;
(6) 4 to 75 wt % of mist flour M.B which contains 10 to 70 wt % of mist flour; preferably 8 to 55 wt %; and
(7) 0 to 25 wt % of thermoplastic elastomer preferably 5 to 20 wt %;

Please replace the paragraph in page 7, lines 8-11 with the following amended paragraph: The thermoplastic elastomer (TPE) is preferably a thermoplastic elastomer containing propylene and having a melting point of 60° C. or lower, and may be selected from one or more of styrenic block copolymers (SBC), thermoplastic olefin elastomer (TPO) and thermoplastic vulcanizates (TPV).

The mist flour may be added directly or in the form of a masterbatch (M.B) to the formulation of the printing surface layer. The printing surface layer of the matte synthetic paper of the present disclosure is added in the form of a masterbatch (M.B), and a surface having high surface haze and low gloss can be obtained.

The mist flour may be selected from organic mist flour and inorganic mist flour. The main component of the organic mist flour is wax, and may be selected from metal soaps of synthetic wax and stearic acid. The matte synthetic paper of the present disclosure can increase the haze of the surface of the printing surface layer (or the outermost paper layer thereof) by adding inorganic mist flour.

When the inorganic mist flour is in the form of a masterbatch (M.B), the mist flour includes silicon oxide (i.e., a white carbon black matting agent) as a main component and other components such as talc powder, and barium sulfate. The silicon oxide may be replaced by a modified cerium oxide surface.

The particle size of the silicon oxide of the inorganic mist flour is between 4 and 12 μm; the particle size of the talc powder of the inorganic mist flour is between 2 and 8 μm; and the particle size of the barium sulfate of the inorganic mist flour is between 0.6 and 2 μm.

In the matte synthetic paper of the present disclosure, after adding the mist flour to the formulation of the outer surface layer (or outermost paper layer), the mist flour can promote formation of a slightly rough surface on the surface (or printing surface) of the outer surface layer of the matte synthetic paper of the present disclosure. When incident light reaches a slightly rough surface, a direction of light reflection changes, so that the synthetic paper has a printing surface with high haze and low gloss.

The thermoplastic elastomer has a low melting point. After adding the mist flour and the thermoplastic elastomer to the formulation, the pit defects on the printing layer (or outermost paper layer) generated in the manufacturing process can be filled since the thermoplastic elastomer has a characteristic of the low melting point. Therefore, the printing surface layer of the matte synthetic paper of the present disclosure has high haze and low gloss, and meets a requirement that the printing surface has no pits and has uniform haze.

The thermoplastic elastomer (TPE) is preferably a thermoplastic elastomer containing propylene and having a melting point of 60° C. or lower, and may be selected from one or more of styrenic block copolymers (TPE-S), thermoplastic olefin elastomer (TPO) and thermoplastic vulcanizates (TPV).

The styrene block copolymer (SBC) is selected from styrene-butadiene-styrene elastomer (SBS) and styrene-ethylene/butylene-styrene elastomer (SEBS).

The thermoplastic polyolefin elastomer (TPO) may be selected from propylene-based elastomers of the trade name Vistamaxxt series, or ethylene alpha-olefin copolymers of the trade name Exact series manufactured by ExxonMobil Chemical Co., Ltd.; olefin block copolymer of the trade name INFUSE series or a polyolefin of the trade name AFFRINITY series or polyolefin elastomers of the trade name ENGAGE series manufactured by the Dow Chemical Company of the United States; and polyolefin elastomer of the trade name TAFMER series manufactured by Mitsui Chemicals, Inc.

The thermoplastic vulcanizate (TPV) may be selected from polypropylene/ethylene propylene diene monomer (PP/EPDM) rubber of the trade name Vistalon series manufactured by ExxonMobil Chemical of the United States.

The following embodiments and examples are given to illustrate contents of the present disclosure and the achievable effects, but the present disclosure is not limited thereto. The physical properties of the embodiments and comparative examples are evaluated by the following methods:

1. Gloss (%):

Measuring the gloss of paper at 75° by using the Tappi T480 standard.

2. Roughness (μm):

Measuring the roughness by using the TAPPI T-555 pm-94 standard.

3. Dispersion:

Observing whether agglomerates are present on the printing surface layer (or outermost paper layer) by human eyes.

If aggregates appear on the printing surface layer, the composition has poor dispersion, and if aggregates don't appear on the printing surface layer, the composition has good dispersion.

4. Surface Foaming:

Whether or not the outer surface of the synthetic paper has a foaming defect is observed by human eyes.

If the printing surface layer is foamed, the film surface of the printing surface layer has poor foaming properties, and if the printing surface layer isn't foamed, the film surface of the printing surface layer has good foaming properties 5. Sticking Property:

Whether or not a laminated product co-pushed into hot-melt state sticks to a first cooling wheel, after being rapidly cooled by the cooling molding device, is observed by human eyes.

If the laminated product sticks to the wheel, the printing surface has bad sticking property, and if the laminated product doesn't stick to the wheel, the printing surface has good sticking property.

6. Pit Defects:

Whether the outer surface of the printing surface (or outermost paper layer) has a concave defect or not is observed by human eyes.

First Embodiment

Referring to the raw material formulation of Table 1, the raw materials of the printing surface layer of the synthetic paper are formulated, including mist flour M.B 8 wt %, polypropylene 57 wt %, titanium dioxide M.B 15 wt %, calcium carbonate M.B 15 wt %, and antioxidant M.B 5 wt %.

Figure 2:
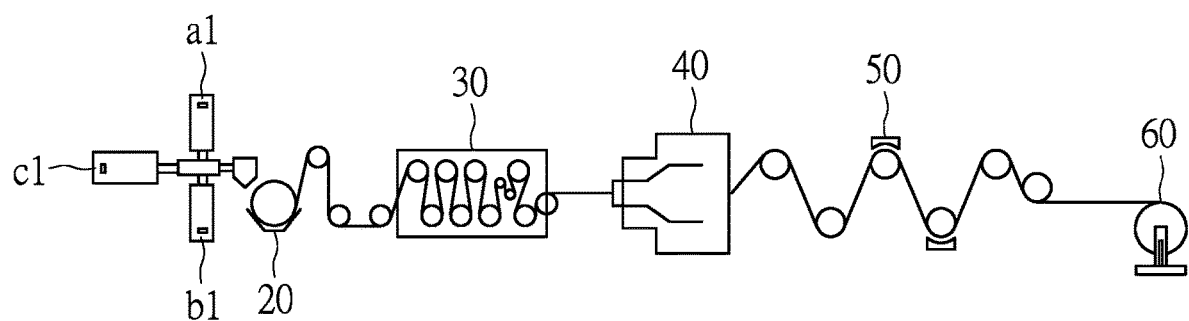
FIG. 2 is a manufacturing flow chart of the synthetic paper with the three-layer structure.

Referring to a manufacturing process shown in FIG. 2, after three extruder fusion co-press processes, through a rapid cooling of a cooling molding device, a three-layer laminate is formed at a temperature of 15 to 70° C. The three-layer laminate is longitudinally extended 4 times by a longitudinal extension device at a temperature of 155-150° C., and then transversely extended 8 times by a transverse extension device at a temperature of 140-200° C. After that, a surface tension is increased by a corona treatment of 60 kw power high-frequency, that is, an 80 μm three-layer co-extruded biaxially stretched synthetic paper product is obtained.

The physical properties of the printing surface layer of the obtained synthetic paper are shown in Table 1.

Second Embodiment

Referring to the raw material formulation of Table 1, the raw materials of the printing surface layer of the synthetic paper are formulated, including mist flour M.B 16 wt %, polypropylene 40 wt %, titanium dioxide M.B 15 wt %, calcium carbonate M.B 15 wt %, and antioxidant M.B 5 wt %.

An 80 μm three-layer co-extruded biaxially stretched synthetic paper product is obtained by the same processing method of the first embodiment.

The physical properties of the printing surface layer of the obtained synthetic paper are shown in Table 1.

Third Embodiment

Referring to the raw material formulation of Table 1, the raw materials of the printing surface layer of the synthetic paper are formulated, including mist flour M.B 4 wt %, polypropylene 61 wt %, titanium dioxide M.B 15 wt %, calcium carbonate M.B 15 wt %, and antioxidant M.B 5 wt %.

An 80 μm three-layer co-extruded biaxially stretched synthetic paper product is obtained by the same processing method of the first embodiment.

The physical properties of the printing surface layer of the obtained synthetic paper are shown in Table 1.

Fourth Embodiment

Referring to the raw material formulation of Table 1, the raw materials of the printing surface layer of the synthetic paper are formulated, including mist flour M.B 15 wt %, polypropylene 50 wt %, titanium dioxide M.B 15 wt %, calcium carbonate M.B 15 wt %, and antioxidant M.B 5 wt %.

An 80 μm three-layer co-extruded biaxially stretched synthetic paper product is obtained by the same processing method of the first embodiment.

The physical properties of the printing surface layer of the obtained synthetic paper are shown in Table 1.

Fifth Embodiment

Referring to the raw material formulation of Table 1, the raw materials of the printing surface layer of the synthetic paper are formulated, including mist flour M.B 40 wt %, polypropylene 25 wt %, titanium dioxide M.B 15 wt %, calcium carbonate M.B 15 wt %, and antioxidant M.B 5 wt %.

An 80 μm three-layer co-extruded biaxially stretched pearlescent synthetic paper product is obtained by the same processing method of the first embodiment.

The physical properties of the printing surface layer of the obtained synthetic paper are shown in Table 1.

Sixth Embodiment

Referring to the raw material formulation of Table 1, the raw materials of the printing surface layer of the synthetic paper are formulated, including mist flour M.B 55 wt %, polypropylene 10 wt %, titanium dioxide M.B 15 wt %, calcium carbonate M.B 15 wt %, and antioxidant M.B 5 wt %.

An 80 μm three-layer co-extruded biaxially stretched pearlescent synthetic paper product is obtained by the same processing method of the first embodiment.

The physical properties of the printing surface layer of the obtained synthetic paper are shown in Table 1.

Seventh Embodiment

Referring to the raw material formulation of Table 1, the raw materials of the printing surface layer of the synthetic paper are formulated, including mist flour M.B 55 wt %, thermoplastic elastomer 6 wt %, polypropylene 4 wt %, titanium dioxide M.B 15 wt %, calcium carbonate M.B 15 wt %, and antioxidant M.B 5 wt %.

An 80 μm three-layer co-extruded biaxially stretched pearlescent synthetic paper product is obtained by the same processing method of the first embodiment.

The physical properties of the printing surface layer of the obtained synthetic paper are shown in Table 1. According to Table 1, the sticking property is satisfactory, and the gloss of the printing surface layer is low and the haze is high, but there are still some pits.

Eighth Embodiment

Referring to the raw material formulation of Table 1, the raw materials of the printing surface layer of the synthetic paper are formulated, including mist flour M.B 55 wt %, thermoplastic elastomer 10 wt %, titanium dioxide M.B 15 wt %, calcium carbonate M.B 15 wt %, and antioxidant M.B 5 wt %.

An 80 μm three-layer co-extruded biaxially stretched pearlescent synthetic paper product is obtained by the same processing method of the first embodiment.

The physical properties of the printing surface layer of the obtained synthetic paper are shown in Table 1. According to Table 1, the sticking property is satisfactory, and the gloss of the printing surface layer is low and the haze is high, also here are no pits.

COMPARATIVE EXAMPLE 1

Referring to the raw material formulation of Table 1, the raw materials of the printing surface layer of the synthetic paper are formulated, the mist flour and the thermoplastic elastomer are not used, including polypropylene 15 wt %, titanium dioxide M.B 15 wt %, calcium carbonate M.B 15 wt %, and antioxidant M.B 5 wt %.

An 80 μm three-layer co-extruded biaxially stretched pearlescent synthetic paper product is obtained by the same processing method of the first embodiment.

The physical properties of the printing surface layer of the obtained synthetic paper are shown in Table 1. According to Table 1, the sticking property is not good, and the gloss of the printing surface layer is low and the haze is high, but there are still some pits.

COMPARATIVE EXAMPLE 2

Referring to the raw material formulation of Table 1, the raw materials of the printing surface layer of the synthetic paper are formulated, the mist flour and the thermoplastic elastomer are not used, the formulation including polypropylene 45 wt %, polyethylene 20 wt %, titanium dioxide M.B 15 wt %, calcium carbonate M.B 15 wt %, and antioxidant M.B 5 wt %.

An 80 μm three-layer co-extruded biaxially stretched pearlescent synthetic paper product is obtained by the same processing method of the first embodiment.

The physical properties of the printing surface layer of the obtained synthetic paper are shown in Table 1. According to Table 1, the sticking property is satisfactory, and the gloss of the printing surface layer is low and the haze is high, but there are still some pits.

In conclusion, in the raw material of the printing surface layer of embodiments 1 to 6, the printing surface layer of the synthetic paper obtained by adding and using the mist flour has the characteristics of low gloss and high haze, and is excellent in printability and suitable for printing.

In the raw materials of the printing surface layer of embodiments 7-8, mist flour and thermoplastic elastomer are added, and the printing surface layer of the synthetic paper obtained has uniform haze and no pit defects on the surface. The surface also has the characteristics of low gloss and high haze, and has excellent printability and is suitable for printing.

In the raw materials of the printing surface layers of Comparative Examples 1 and 2, no mist flour or thermoplastic elastomer is added, and the printing surface layer of the obtained synthetic paper not only has many pit defects on the surface, but also has high gloss and low haze, thus not suitable as printing paper.

TABLE 1

Formulation and physical properties of the printing surface layer of synthetic paper

| | Number | Embodiment | | | | | | | | Comparative example | |
|---|---|---|---|---|---|---|---|---|---|---|---|
| | | 1 | 2 | 3 | 4 | 5 | 6 | 7 | 8 | 1 | 2 |
| Formulation | Polypropylene | 57% | 49% | 61% | 50% | 25% | 10% | 4% | | 65% | 45% |
| | Polyethylene | | | | | | | | | | 20% |
| | Titanium dioxide M.B (containing 40 wt % of titanium dioxide) | 15% | 15% | 15% | 15% | 15% | 15% | 15% | 15% | 15% | 15% |
| | Calcium carbonate M.B (containing 60 wt % of calcium carbonate) | 15% | 15% | 15% | 15% | 15% | 15% | 15% | 15% | 15% | 15% |
| | Antioxidant M.B (containing 10 wt % of antioxidant) | 5% | 5% | 5% | 5% | 5% | 5% | 5% | 5% | 5% | 5% |

TABLE 1-continued

Formulation and physical properties of the printing surface layer of synthetic paper

| Number | | Embodiment 1 | 2 | 3 | 4 | 5 | 6 | 7 | 8 | Comparative example 1 | 2 |
|---|---|---|---|---|---|---|---|---|---|---|---|
| mist flour M.B | Talc powder M.B (containing 70 wt % of talc powder) | 8% | 16% | — | — | | | | | | |
| | Ceria M.B (containing 20 wt % of ceria) | — | — | 4% | 15% | | | | | | |
| | Barium sulfate M.B (containing 60 wt % of barium sulfate) | — | — | — | — | 40% | 55% | 55% | 55% | | |
| | thermoplastic elastomer | | | | | | | 6% | 10% | | |
| Gloss (%) | | 43-46 | 33-35 | 37-38 | 26-28 | 38-41 | 18-22 | 19-22 | 18-22 | 60-62 | 45-48 |
| Roughness (μm) | | 1.2-1.6 | 1.6-1.7 | 1.1-1.3 | 1.8-2.0 | 1.2-1.4 | 1.5-1.7 | 1.4-1.6 | 1.4-1.7 | 1.1-1.3 | 1.4-1.6 |
| Dispersion | | good | good | good | good | good | good | good | good | good | good |
| Surface foaming | | good | good | good | good | good | good | good | good | good | good |
| Sticking property | | fair | fair | fair | fair | fair | fair | good | good | bad | bad |
| Pit defects | | fewer | fewer | fewer | fewer | fewer | fewer | fewer | no | more | more |

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A matte synthetic paper, which is a biaxially oriented polypropylene synthetic paper having a thickness of 25 to 300 μm, comprising a printing surface layer as an outermost paper layer,
   wherein a gloss of the printing surface layer is 15 to 50% as measured according to Tappi T480, and based on the total weight of the printing surface layer, the composition of the printing surface layer includes the following components, and the total of each component is 100% by weight:
   (1) 0 to 66 wt % of polypropylene;
   (2) 0 to 30 wt % of polyethylene;
   (3) 10 to 15 wt % of titanium dioxide M.B which contains 30 to 60 wt % of titanium dioxide;
   (4) 10 to 15 wt % of calcium carbonate M.B which contains 40 to 70 wt % of calcium carbonate;
   (5) 1 to 5 wt % of antioxidant M.B;
   (6) 4 to 75 wt % of mist flour M.B which contains 10 to 70 wt % of mist flour; and
   (7) 0 to 25 wt % of thermoplastic elastomer having a melting point of 60° C. or less.

2. The matte synthetic paper according to claim 1, wherein based on the total weight of the printing surface layer, the composition thereof includes the following components, and the total and the total of each component is 100% by weight:
   (1) 2 to 65 wt % of polypropylene;
   (2) 1 to 15 wt % of polyethylene;
   (3) 10 to 15 wt % of titanium dioxide M.B which contains 30 to 60 wt % of titanium dioxide;
   (4) 10 to 15 wt % of calcium carbonate M.B which contains 40 to 70 wt % of calcium carbonate;
   (5) 1 to 5 wt % of antioxidant M.B;
   (6) 8 to 55 wt % of mist flour M.B which contains 10 to 70 wt % of mist flour; and
   (7) 5 to 20 wt % of thermoplastic elastomer.

3. The matte synthetic paper according to claim 1, wherein the matte synthetic paper is a synthetic paper having a laminated structure of three or more layers.

4. The matte synthetic paper according to claim 1, wherein the matte synthetic paper is a synthetic paper having a laminated structure of five or more layers.

5. The matte synthetic paper according to claim 1, wherein the mist flour M.B is mainly composed of silicon oxide, and the other components include talc powder and barium sulfate.

6. The matte synthetic paper according to claim 1, wherein the thermoplastic elastomer is selected from one or more of styrene block copolymer, thermoplastic polyolefin elastomer (TPO) and thermoplastic vulcanizate (TPV).

7. The matte synthetic paper according to claim 6, wherein the styrene block copolymer (SBC) is selected from styrene-butadiene-styrene elastomer (SBS) and styrene-ethylene/butylene-styrene elastomer (SEBS).

8. The matte synthetic paper according to claim 6, wherein the thermoplastic polyolefin elastomer (TPO) is selected from ethylene alpha-olefin copolymer and polyolefin elastomer.

9. The matte synthetic paper according to claim 6, wherein the thermoplastic vulcanizate (TPV) is a polypropylene/ethylene propylene diene monomer (PP/EPDM) rubber.

* * * * *